United States Patent [19]

Old et al.

[11] Patent Number: 4,791,810
[45] Date of Patent: Dec. 20, 1988

[54] FLOW MONITORING

[75] Inventors: Charles F. Old, Wantage; Christopher B. Scruby, Botley, both of England

[73] Assignee: United Kingdom Atomic Energy Authority, London, England

[21] Appl. No.: 39,271

[22] Filed: Apr. 17, 1987

[30] Foreign Application Priority Data

May 1, 1986 [GB] United Kingdom ............... 8610671

[51] Int. Cl.[4] .................................... G01M 15/00
[52] U.S. Cl. .................................... 73/119 A
[58] Field of Search ............ 73/119 A, 861.18, 861.19, 73/861.21, 198, 113, 861.26

[56] References Cited

U.S. PATENT DOCUMENTS

| | | | |
|---|---|---|---|
| 3,289,077 | 11/1966 | Miller | 73/119 A |
| 3,580,092 | 5/1971 | Scarpa | 73/861.18 |
| 3,731,527 | 5/1973 | Weaver | 73/119 A |
| 3,816,773 | 6/1974 | Baldwin et al. | 73/861.21 |
| 3,821,726 | 6/1974 | Chang et al. | 73/861.18 |
| 4,052,663 | 10/1977 | Lindsey | 73/119 A |
| 4,109,517 | 8/1978 | Dyballa et al. | 73/119 A |
| 4,523,458 | 6/1985 | Daniel | 73/119 A |
| 4,577,496 | 3/1986 | Grover | 73/119 A |

FOREIGN PATENT DOCUMENTS

| | | | |
|---|---|---|---|
| 0078987 | 5/1983 | European Pat. Off. | |
| 0020553 | 2/1982 | Japan | 73/119 A |
| 0188764 | 11/1982 | Japan | 73/119 A |
| 0070879 | 4/1984 | Japan | 73/119 A |
| 1372724 | 11/1974 | United Kingdom | |
| 2035560 | 6/1980 | United Kingdom | |
| 2089986 | 6/1982 | United Kingdom | |
| 2122252 | 1/1984 | United Kingdom | |
| 2146119 | 4/1985 | United Kingdom | |

Primary Examiner—Stewart J. Levy
Assistant Examiner—Robert R. Raevis
Attorney, Agent, or Firm—William R. Hinds

[57] ABSTRACT

An apparatus and a method are provided for detecting and monitoring flow of a fluid through an injector, such as a fuel injector (10) of a diesel engine. Ultrasonic waves are detected by a transducer (12), and signals passed through a filter (20), so as to observe broadband signals of frequency above 100 kHz. Such signals are due to turbulent flow through the injector orifice (38), and so enable the flow itself to be detected.

3 Claims, 4 Drawing Sheets

Time/ms

FLOW MONITORING

This invention relates to a method and an apparatus for monitoring fluid flow, especially the operation of an injection, for example a fuel injector of a diesel engine or of a petrol engine.

A technique is known for monitoring a diesel engine injector, and described in UK Patent Application Nos. GB 2 122 252 A, GB 2 146 119 A (Froude) and in U.S. Pat. No. 4,577,496 (Grover et al), in which ultrasonic sound pulses at or near 40 kHz are detected. It has however been found that this technique does not give reliable results with all diesel injectors under practical conditions. Other known or proposed techniques are the detection of vibration in a fuel pipe due to a pressure wave pulse in fuel within the pipe; and the detection of the noise emitted as an injector valve needle hits an abutment or stop. Both of these are essentially indirect methods, detecting the occurrence of phenomena which can be expected to occur almost simultaneously with the emergence of fuel from the injector, but not detecting the emergence of the fuel itself.

According to the present invention there is provided a method for monitoring the operation of an injector comprising detecting, by means of a broadband ultrasonic transducer sensitive to waves throughout the frequency range 100 kHz to 1 MHz, noise due to turbulent flow of fluid through the injector; filtering out noise signals below a cut-off frequency of 100 kHz; and generating an output signal representing the noise signals throughout a broad frequency band above the cut-off frequency.

The invention also provides an injector monitoring apparatus, including a broadband ultrasonic transducer sensitive to ultrasonic waves of frequencies throughout the range 100 KHz to 1 MHz, means for acoustically coupling the transducer to an injector, means for amplifying noise signals from the transducer, for filtering out noise signals below a cut-off frequency of 100 kHz, and for generating an output signal representing the noise signals from the transducer throughout a broad frequency band above the cut-off frequency, and means responsive to the output signal for indicating fluid flow through the injector.

The invention also provides an apparatus for monitoring operation of an injector, including a broadband ultrasonic transducer sensitive to ultrasonic waves of frequencies in the range 100 kHz to 2 MHz, means for acoustically coupling the transducer to the injector, and means responsive to signals from the transducer for sensing fluid flow through the injector.

Because the noise due to turbulent flow extends over a broad spectrum of frequencies, the transducer may be sensitive to waves in the whole spectrum from 100 kHz to 2 MHz (or even higher) or alternatively may be sensitive to only a part of the spectrum, for example 100 kHz to 300 kHz. To ensure that the noise is sampled in an adequately representative way and to ensure that the apparatus will work with different injectors (for which the noise spectrum will be slight different) it is desirable for the transducer to be sensitive over a bandwidth equal to at least a third of the mean frequency to which it is sensitive, and preferably of greater bandwidth than that. It will be appreciated that the bandwidth may be a property of the transducer itself, or may be set by a signal filter to which signals from the transducer are supplied. It is expected that as an engine runs faster or at greater load, the background noise will tend to increase more at lower frequencies than at higher frequencies, so that the signal-to-noise ratio at 40 kHz would deteriorate more than that in the frequency range 100 kHz to 1 MHz.

The apparatus of the invention may be used when checking engine operation on a test-bed or during maintenance, or it may be incorporated in an engine management system for continuously monitoring a working engine.

The invention will now be further described, by way of example only, and with reference to the accompanying drawings in which.

Figure 1:
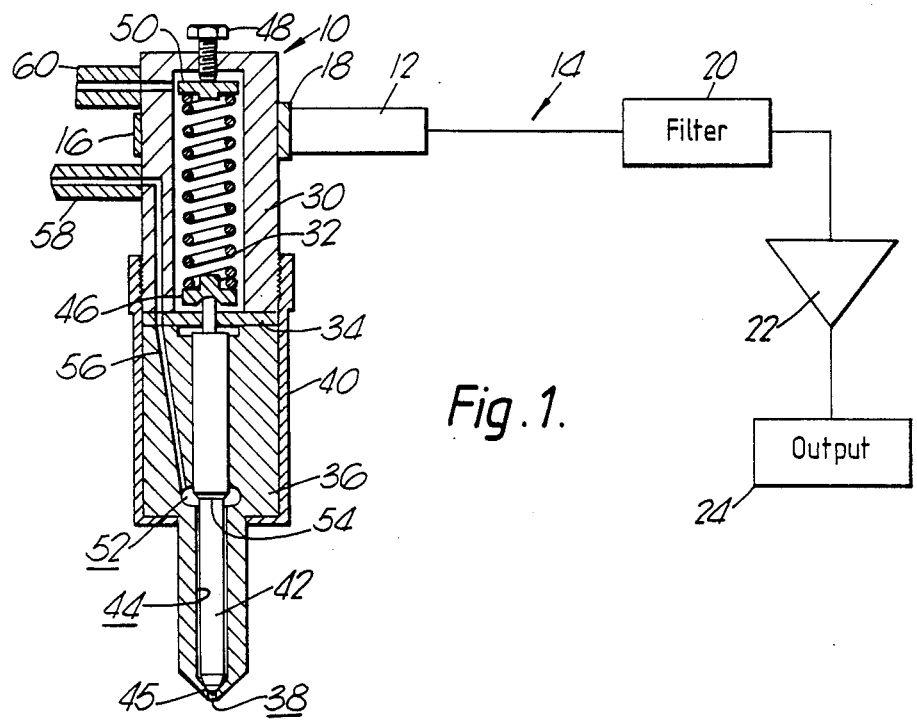
FIG. 1 shows an apparatus for monitoring a diesel engine injector, the injector being shown in section, and the electronic circuitry being shown diagrammatically.

Referring to FIG. 1 there is shown a diesel injector 10, near the top end of which is mounted a broadband ultrasonic transducer 12 of an injector monitoring apparatus 14. The transducer 12 is connected to the injector 10 by a spring clamp 16 and is acoustically coupled to the injector 10 by vacuum grease and by a glass couplant piece 18, which isolates it electrically and thermally. The transducer 12 is sensitive to ultrasonic waves over the entire frequency range from about 1 kHz to several megahertz, and produces corresponding electrical signals. The electric signals are passed through a band-pass filter 20, which passes those signals in the frequency range 100 kHz to 1 MHz. Signals from the filter 20 are passed through an amplifier 22 to an output unit 24.

The injector 10 comprises an upper tubular component 30 enclosing a helical spring 32; a guide plate 34 with a central hole; and a lower, tubular component 36 defining at its lower end an orifice 38. These are held together by a casing 40 which is threaded to engage with the upper component 30. A needle valve 42 locates within a bore 44 through the lower component 36. At its lower end it abuts a conical valve seat 45; at its upper end a narrower portion of the needle valve 42 extends through the guide plate 34, abutting a cap 46 urged downward by the spring 32. The force of the spring 32 on the needle valve 42 can be adjusted by a bolt 48 acting through another cap 50 onto the upper end of the spring 32. The bore 44 is of substantially constant diameter throughout its length, except for an annular groove 52. The portion of the needle valve 42 which lies above the groove 52 is a sliding fit in the bore 44, whereas the portion which lies below the groove 52 is narrower, these portions being joined by a tapered portion 54. A duct 56 extends through the injector 10 from a diesel fuel inlet pipe 58 to the groove 52. A small quantity of fuel leaks from the groove 52 upwardly along the bore 44 and through the hole in the guide plate 34 into the upper tubular component 30, to escape through a return pipe 60, thus lubricating both the needle valve 42 and also the spring 32. Although the injector 10 has been described in some detail, it will be appreciated that the invention is equally applicable to injectors of different designs.

In operation of the injector 10, when fuel is to be injected through the injector orifice 38, an injection pump (not shown) causes a high pressure pulse (80–300 atm=8-30 MPa) to be transmitted through the fuel in the inlet pipe 58 and so along the duct 56 into the groove 52. This pressure acting on the tapered portion 54 lifts the needle valve 42, so opening the orifice 38, the movement of the needle valve 42 being limited by the guide plate 34, which acts as a stop. Fuel then flows sonically through the gap between the needle valve 42 and the valve seat 45 and through the orifice 38, until the pressure drops sufficiently that the spring 32 urges the valve 42 down again to seal with the valve seat 45. The flow of the fuel through the gap and through the orifice 38 is at a very high Reynolds number, and so it is turbulent and generates ultrasonic vibrations which propagate as ultrasonic waves through the injector 10, setting some of the injected components into mechanical resonance, and are detected by the transducer 12. Impact of the needle valve 42 against either the guide plate 34 or the valve seat 45 will also generate ultrasonic waves.

Figure 2:
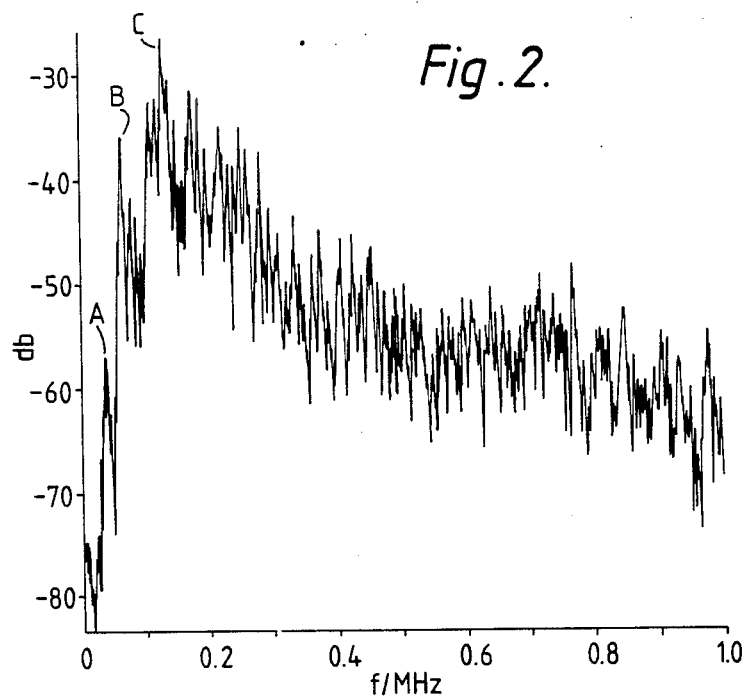
FIG. 2 shows graphically part of the frequency spectrum of the ultrasonic signals in the circuitry of FIG. 1, generated as a result of fluid flow through the injector of FIG. 1.

Referring to FIG. 2, this shows graphically the frequency spectrum of the ultrasonic signals received by the output unit 24 when the injector 10 operates as described above to inject fuel. It will be observed that 2 discrete peak amplitudes are detected at 40 kHz (marked A) and at 67 kHz (marked B) in spite of passage through the filter 20; these are believed to correspond to mechanical vibration modes of components of the injector 10. Without the filter 20, these peaks A and B would dominate the ultrasonic spectrum. The largest amplitude is at 133 kHz (marked )). Above about 120 kHz there is essentially broadband noise without discrete peaks. This broadband spectrum is characteristic of noise generated by the turbulent flow of the fuel itself, a similar spectrum being obtained even if (as an experiment) the needle valve 42 is fixed in the open position so that there is no noise from impacts.

Figure 3A:
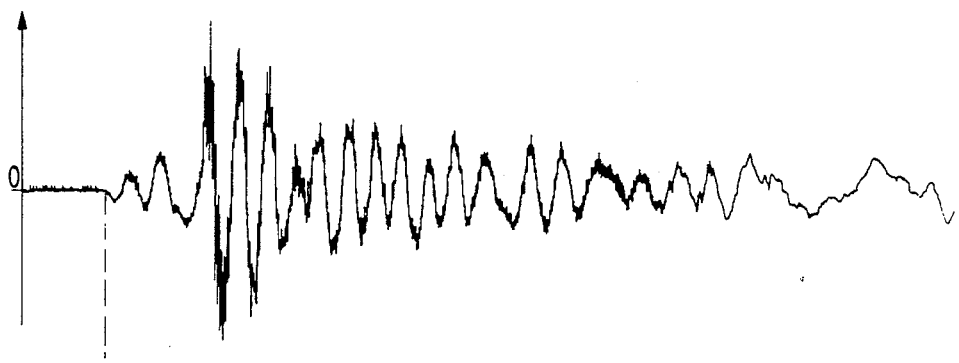
FIGS. 3a and 3b show graphically signals at two different points in the circuitry of FIG. 1.
Figure 3B:
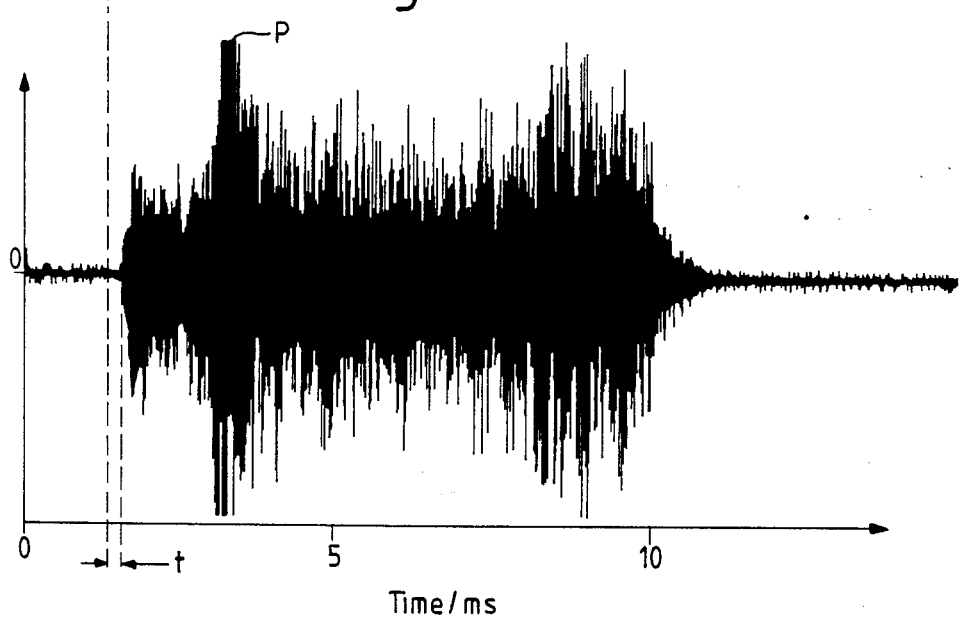

Referring now to FIGS. 3a and b, these show graphically as a function of time the signals produced by the transducer 12 and the signals received by the output unit 24 respectively. These signals were obtained in a test rig rather than an engine, and the fuel injection is of longer duration than in an engine. The unfiltered signals of FIG. 3a are dominated by a low frequency signal of period about 0.5 ms (f=2 kHz) onto which high frequency signals are superimposed. It is clear from a comparison of the two graphs that this low frequency signal commences a short time t before the high frequency signal; in this case t=0.23 ms. This is clearly consistent with the low frequency signal representing a mechanical vibration, caused by the pressure pulse in the fuel, and the high frequency signal representing the noise generated by the turbulent flow, which only commences after the needle valve 42 has been raised.

High-speed photography of the injector 10 when operating in this test rig has also been performed, with a camera running at 2100 frames/second. This showed a good correlation between the onset and the end of the flow from the injector as observed optically, and the start and the end of the high frequency, filtered, acoustic signal. There was also observed a qualitative dependence of the filtered acoustic signal on the flow rate. However the large amplitude peak P in the filtered acoustic signal (at which the amplifier 22 is overloaded) does not represent a large flow rate, but in fact is due to the impact of the needle valve 42 against the guide plate 34.

In a running diesel engine the acoustic signals tend to be more complex than in a test rig. The injector pump typically produces a higher pressure pulse in the inlet pipe 58 than is produced in a test rig, and, especially at full load, the rapid pressure rise causes the needle valve hit the stop, i.e. the guide plate 34, at high velocity and to generate a large impact signal which dominates the flow signal. There is also often a further impact signal when the valve 42 hits the valve seat 45. Both impacts may involve the valve 42 bouncing, with a small amplitude, and the generation of further impact noise. However the flow signal is a more reliable indicator of the opening of the injector 10 than is the impact signal from the stop. Although the impact signal is larger, its magnitude is dependent on the rate of pressure increase, and is more variable with engine conditions. Indeed under some conditions, e.g. light load, the needle valve 42 does not move far enough to hit the stop and so the impact signal is absent. The onset of flow can of course be observed, because it precedes the first impact signal; the end of the flow is sometimes less easy to observe, as it may be masked by other noises.

Figure 4:
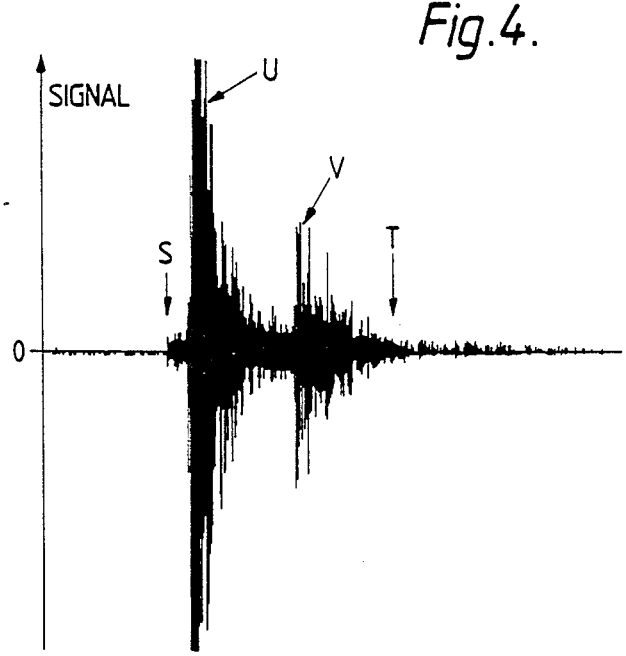
FIGS. 4 and 4a show graphically output signals produced by the apparatus of FIG. 1, and the displacement of the needle valve, in a running diesel engine.
Figure 4A:
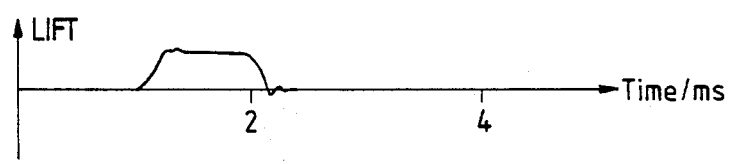

Referring to FIGS. 4 and 4a these show graphically, as a function of time, the signals received by the output unit 24 when the injector 10 forms part of a 2 liter four-cylinder four-stroke engine; and the signal from a needle valve lift sensor (not shown) connected to the injector 10, respectively. The engine in this case was operating at full load (80 Nm) and 1500 r.p.m. The flow signal commences at S and appears to stop at about T, 1.9 ms later. There are two impact signals, U and V, each of duration about 0.5 ms, which occur when the needle valve 42 hits first the stop and then the valve seat 45, respectively, as can be observed from a comparison of the two graphs. It will also be observed, from FIG. 4a, that the needle valve 42 bounces slightly at each impact.

Figure 5:
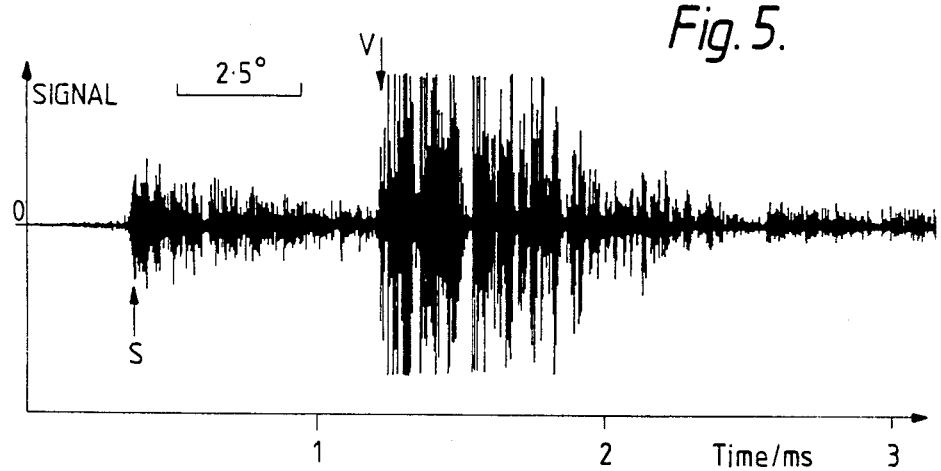
FIGS. 5 and 6 show graphically output signals produced by the apparatus of FIG. 1 in a running diesel engine under different operating conditions.

Referring to FIG. 5 there is shown graphically the signal received by the output unit 24 when the injector is a CAV injector in a 2-liter engine, and using a Bosch injector pump. The engine in this case is on high load. and is operating at a low speed of 1000 r.p.m. In this case the injector opens (as sensed by the needle lift sensor) at S, causing the start of the high frequency flow signal, and the needle valve closes against the valve seat at V, creating a large impact noise (which overloads the amplifier; note that the amplifier is set to amplify the signals more than in the graph of FIG. 4). In this case the needle valve apparently did not hit the stop, so there is no initial impact noise.

Figure 6:
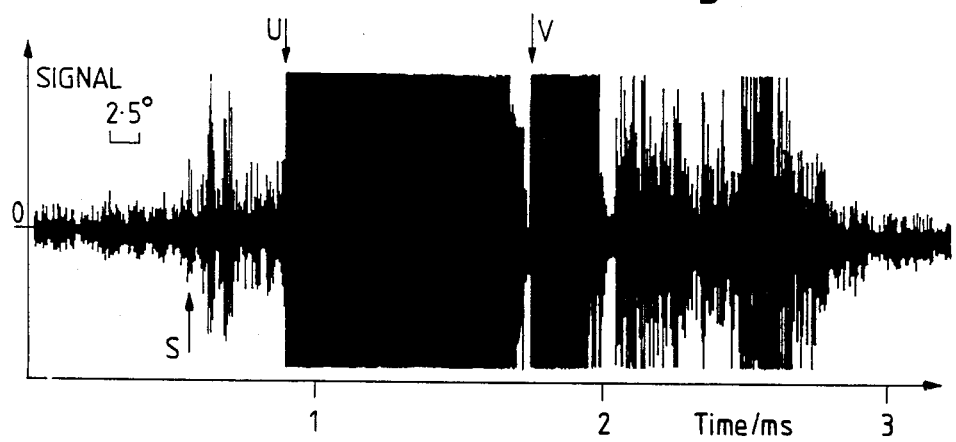

Referring to FIG. 6 there is shown graphically the signal received by the output unit 24 with the injector and engine referred to in relation to FIG. 5, when the engine is operating at high load and at 4500 r.p.m. From the needle lift sensor the injector needle valve hits the stop at U and hits the valve seat at V, bouncing slightly in each case. It would appear from the graph that fluid flow starts at S, almost 0.3 ms before the injector is fully open. The impact noise at U is so large that the amplifier is overloaded for about the next 0.75 ms.

In both FIGS. 5 and 6 the time is indicated for rotation of the crankshaft through an angle of 2.5 degrees.

It will be appreciated that the method of the invention enables the onset, and sometimes also the duration and termination of the fuel injection to be monitored. It also may enable the quantity of fuel injected to be assessed, because the instantaneous signal amplitude is related to the instantaneous flow rate. Observation of signals above a frequency of 100 kHz enables the fuel flow itself to be detected, whereas below that frequency mechanical vibration modes would predominate. Such high frequencies are rapidly attenuated as they propagate through the engine, so that there is little or no carry-over of signals from the injectors of other cylinders in the engine.

The output unit 24 might be a device to plot the received signals graphically, which may be done by digitizing the signal at for example 5 MHz. Alternatively it might be a device to give a digital output indicating the time of onset for example of the fuel injection burst. Rather than observing the filtered signal directly, it may first be rectified and smoothed, to reduce the effect of noise. When detecting the onset of flow it may be preferable to observe the signals only during a gated time period either related to the angle of rotation of the crankshaft (e.g. between 10 and 5 degrees before top dead centre); or preceding the impact signal U by a predetermined time (e.g. between 0.3 and 0.1 ms before the impact signal). This gated time period in either case is set to encompass the time at which fuel injection is expected to occur in that injector. It will also be understood that the method may be used to monitor flow through injectors of fluids other than fuels—indeed it is applicable to any injector through which bursts of high pressure, high Reynolds number, fluid flow occur.

We claim:

1. An injector monitoring apparatus, including a broad-band ultrasonic transducer sensitive to ultrasonic waves of frequencies throughout the range 100 kHz to 1 MHz, means for acoustically coupling the transducer to an injector, means for amplifying noise signals from the transducer, for filtering out noise signals below a cut-off frequency of 100 kHz, and for generating an output signal representing the noise signals form the transducer throughout a board frequency band above the cut-off frequency, and means responsive to the output signal for indicating fluid flow through the injector.

2. An apparatus as claimed in claim 1 wherein the transducer is sensitive to ultrasonic waves of frequencies throughout the range 100 kHz to 2 MHz, and the output signal represents the noise signals throughout a frequency band from the cut-off frequency to 1 MHz.

3. A method for monitoring the operation of an injector comprising detecting, by means of a broadband ultrasonic transducer sensitive to waves throughout the frequency range 100 kHz to 1 MHz, noise due to turbulent flow of fluid through the injector; filtering out noise signals below a cut-off frequency of 100 kHz; and genernating an output signal representing the noise signals throughout a broad frequency band above the cut-off frequency.

* * * * *